US012731149B2

(12) United States Patent
Gahlot et al.

(10) Patent No.: US 12,731,149 B2
(45) Date of Patent: Sep. 8, 2026

(54) SYSTEMS AND METHODS FOR STATE MACHINE DRIVEN PROGRAMMABLE PAYMENTS

(71) Applicant: JPMORGAN CHASE BANK, N.A., New York, NY (US)

(72) Inventors: Shekhar Gahlot, Singapore (SG); Naveen Mallela, Singapore (SG); Umar Farooq, New York, NY (US); Sai Murali Krishna Valiveti, Singapore (SG); Muh Hwa Lee, Singapore (SG); Wee Kee Toh, Long Island City, NY (US); Daniel Chew, Singapore (SG); Slim Yee Ng, Singapore (SG); Raunak Rajpuria, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/441,723

(22) Filed: Feb. 14, 2024

(65) Prior Publication Data

US 2025/0259181 A1 Aug. 14, 2025

(51) Int. Cl.
*G06Q 20/40* (2012.01)

(52) U.S. Cl.
CPC .................................. *G06Q 20/405* (2013.01)

(58) Field of Classification Search
None
See application file for complete search history.

(56) References Cited

U.S. PATENT DOCUMENTS 12,062,037 B1 * 8/2024 Coventry .............. H04L 9/0825
2018/0032980 A1 * 2/2018 Rodriguez ........... G06Q 20/102
(Continued)

FOREIGN PATENT DOCUMENTS

CN 117455474 A * 1/2024 ............. G06Q 20/10
WO WO-2019246565 A1 * 12/2019 ............. G06Q 40/04
WO WO-2024052053 A1 * 3/2024 ............... H04L 9/50

OTHER PUBLICATIONS

Author unknown, What is a State Machine, retrieved from https://web.archive.org/web/20230602152242/https://statecharts.dev/what-is-a-state-machine.html (Year: 2023).*
(Continued)

*Primary Examiner* — Gregory S Cunningham, II
(74) *Attorney, Agent, or Firm* — GREENBERG TRAURIG LLP

(57) ABSTRACT

Systems and methods for state machine driven programmable payments are disclosed. A method may include: defining a plurality of base state machines; storing definitions for the plurality of base state machines; receiving, via a user interface, a programmable payment instruction ("PPI") from a user comprising a PPI definition of a PPI trigger, a PPI condition, and a PPI action; dynamically linking a state in one of the plurality of base state machines to the PPI definition; storing the PPI definitions; receiving a payment instruction; identifying, from the payment instruction, a base state machine and the PPI instruction linked to the payment instruction; creating a PPI-specific state machine definition for the PPI instruction linked to the payment instruction; and instantiating a PPI-specific state machine for the PPI-specific state machine definitions. The PPI-specific state machine calls one of the plurality of base state machines to execute portions of the payment instruction.

11 Claims, 3 Drawing Sheets

(56) References Cited

U.S. PATENT DOCUMENTS

| | | | | |
|---|---|---|---|---|
| 2018/0089758 | A1 | 3/2018 | Stradling et al. | |
| 2018/0365201 | A1 | 12/2018 | Hunn et al. | |
| 2019/0370799 | A1 | 12/2019 | Vivas et al. | |
| 2022/0067831 | A1 | 3/2022 | Shu et al. | |
| 2022/0188781 | A1 | 6/2022 | El-Bizri | |
| 2023/0061813 | A1 | 3/2023 | Dapeng et al. | |
| 2023/0136805 | A1 | 5/2023 | Morais | |
| 2023/0214832 | A1 | 7/2023 | Hu et al. | |
| 2025/0156784 | A1* | 5/2025 | Thiemann .......... | G06Q 10/0633 |

OTHER PUBLICATIONS

International Search Report and Written Opinion of the International Searching Authority, dated May 13, 2025, from corresponding International Application No. PCT/US2025/015596.

He, Yongchang; “Blockchain-based access and usage control of cloud-based digital twins”, Nov. 1, 2023 (Nov. 1, 2023).

Casas, Ana Margarita Serrano, et al.; “Smart contract generation tool”, Jul. 1, 2023 (Jul. 1, 2023).

* cited by examiner

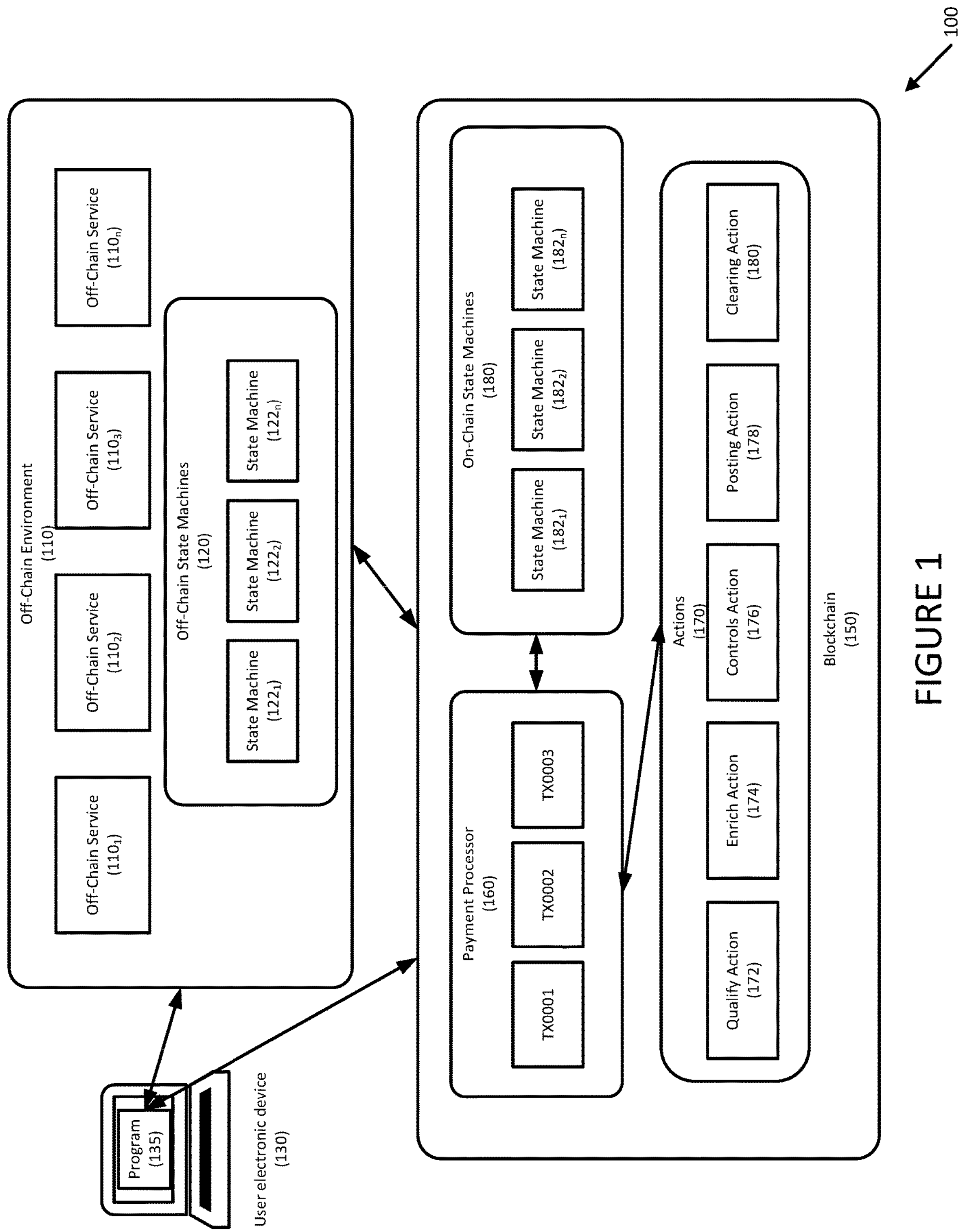
100
Off-Chain Environment (110)
Off-Chain Service ($110_1$)
Off-Chain Service ($110_2$)
Off-Chain Service ($110_3$)
Off-Chain Service ($110_n$)
Off-Chain State Machines (120)
State Machine ($122_1$)
State Machine ($122_2$)
State Machine ($122_n$)
Program (135)
User electronic device (130)
On-Chain State Machines (180)
State Machine ($182_1$)
State Machine ($182_2$)
State Machine ($182_n$)
Payment Processor (160)
TX0001
TX0002
TX0003
Actions (170)
Qualify Action (172)
Enrich Action (174)
Controls Action (176)
Posting Action (178)
Clearing Action (180)
Blockchain (150)
FIGURE 1

SYSTEMS AND METHODS FOR STATE MACHINE DRIVEN PROGRAMMABLE PAYMENTS

BACKGROUND OF THE INVENTION

1. Field of the Invention

Embodiments generally relate to systems and methods for state machine driven programmable payments.

2. Description of the Related Art

The term "programmable money" may be interpreted in multiple ways depending on the context where it is used. For most in the cryptocurrency world, the term refers to currency units represented on a blockchain or similar system whose use or behaviors within the consensually maintained shared state can be controlled by unattended scripts. These unattended scripts are commonly seen as being instances of the autonomously executing "smart contracts" that are used in Ethereum-inspired blockchains.

Outside of cryptocurrency circles, programmable money refers to the opportunities for automation of operations on customer bank accounts through application programming interfaces (APIs) provided by banks to third party providers (TPP) and clients. Programmable payments, however, are payments in which logic is not part of the money, but instead acts on the money.

SUMMARY OF THE INVENTION

Systems and methods for state machine driven programmable payments are disclosed. In one embodiment, a method may include: (1) defining, by a computer program executed by an electronic device, a plurality of base state machines; (2) storing, by the computer program, definitions for the plurality of base state machines; (3) receiving, by the computer program and via a user interface, a programmable payment instruction ("PPI") from a user comprising a PPI definition of a PPI trigger, a PPI condition, and a PPI action; (4) dynamically linking, by the computer program, a state in one of the plurality of base state machines to the PPI definition; (5) storing, by the computer program, the PPI definitions; (6) receiving, by a payment processor computer program, a payment instruction; (7) identifying, by the payment processor computer program and from the payment instruction, a base state machine and the PPI instruction linked to the payment instruction; (8) creating, by the payment processor computer program, a PPI-specific state machine definition for the PPI instruction linked to the payment instruction; and (9) instantiating, by the payment processor computer program, a PPI-specific state machine for the PPI-specific state machine definitions, wherein the PPI-specific state machine is configured to call one of the plurality of base state machines to execute portions of the payment instruction.

In one embodiment, the plurality of base state machines comprise a deposit state machine, a withdraw state machine, and/or a transfer state machine.

In one embodiment, the plurality of state machines may be stored in an on-chain environment.

In one embodiment, the plurality of state machines may be stored in an off-chain environment.

In one embodiment, the definitions for the plurality of base state machines comprise base state machine triggers, base state machine conditions, and base state machine actions.

In one embodiment, the state machine triggers may be event-based or time-based.

In one embodiment, the user interface may include an 'if this then that" interface.

In one embodiment, the method may also include detecting, by payment processor computer program, an event associated with the payment instruction before instantiating the PPI-specific state machine.

In one embodiment, the PPI-specific state machine may be configured to call more than one of the plurality of base state machines.

According to another embodiment, a non-transitory computer readable storage medium may include instructions stored thereon, which when read and executed by one or more computer processors, cause the one or more computer processors to perform steps comprising: defining a plurality of base state machines; storing definitions for the plurality of base state machines; receiving, via a user interface, a programmable payment instruction ("PPI") from a user comprising a PPI definition of a PPI trigger, a PPI condition, and a PPI action; dynamically linking a state in one of the plurality of base state machines to the PPI definition; storing the PPI definitions; receiving a payment instruction; identifying, from the payment instruction, a base state machine and the PPI instruction linked to the payment instruction; creating a PPI-specific state machine definition for the PPI instruction linked to the payment instruction; instantiating a PPI-specific state machine for the PPI-specific state machine definitions; and calling one of the plurality of base state machines to execute portions of the payment instruction.

In one embodiment, the plurality of base state machines comprise a deposit state machine, a withdraw state machine, and/or a transfer state machine.

In one embodiment, the plurality of state machines may be stored on-chain.

In one embodiment, the plurality of state machines may be stored off-chain.

In one embodiment, the definitions for the plurality of base state machines comprise base state machine triggers, base state machine conditions, and base state machine actions.

In one embodiment, the user interface may include an 'if this then that" interface.

In one embodiment, the non-transitory computer readable storage medium may also include instructions stored thereon, which when read and executed by one or more computer processors, cause the one or more computer processors to detect an event associated with the payment instruction before instantiating the PPI-specific state machine.

In one embodiment, the PPI-specific state machine may be configured to call more than one of the plurality of base state machines.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 1 depicts a system for state machine driven programmable payments according to an embodiment;

DETAILED DESCRIPTION OF PREFERRED EMBODIMENTS

Figure 2:
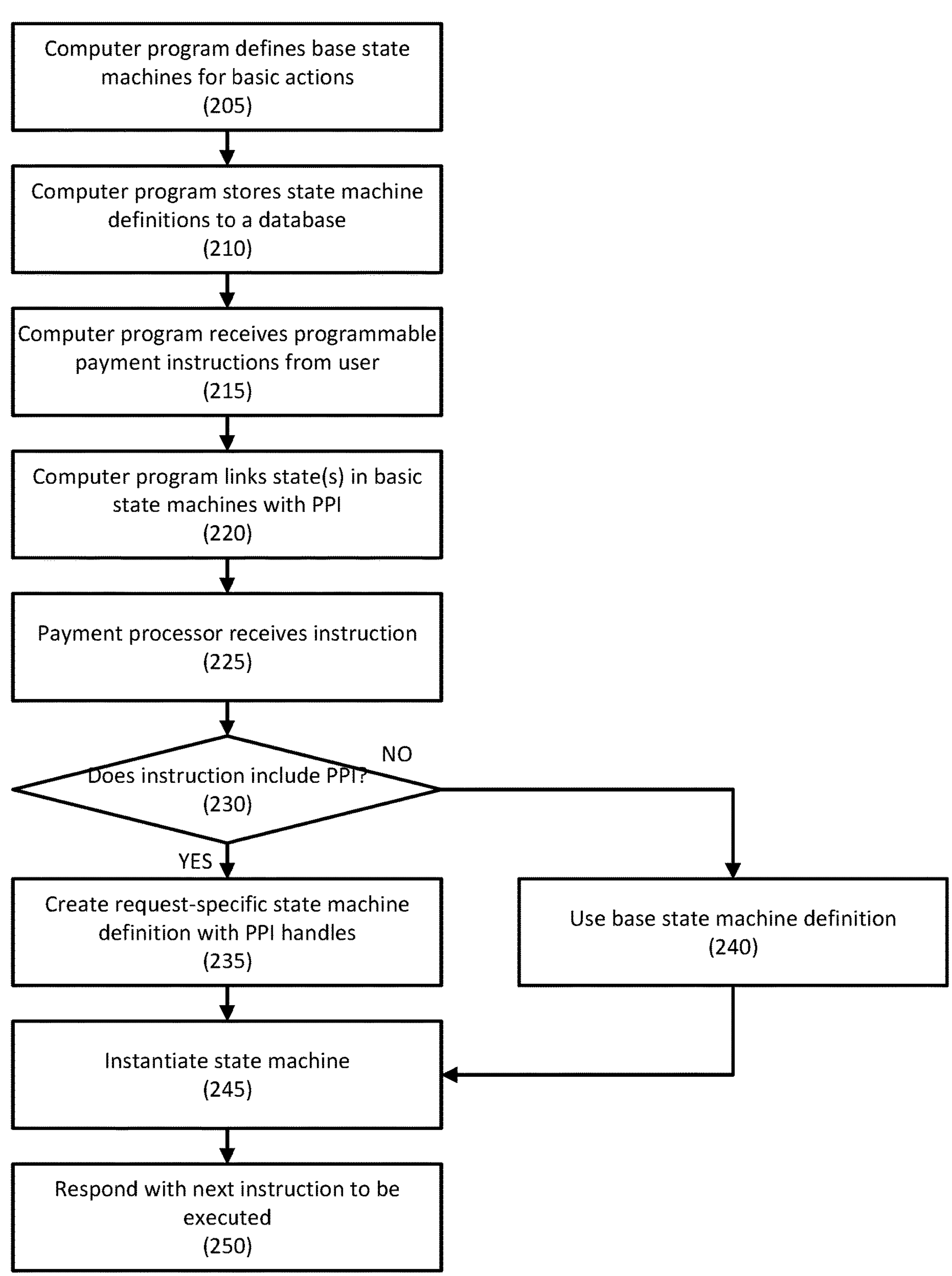
FIG. 2 depicts a method for state machine driven programmable payments according to an embodiment.

Systems and methods for state machine driven programmable payments are disclosed.

The disclosures of U.S. patent application Ser. No. 17/823,250, U.S. Provisional Patent Application Ser. No. 63/238,683, and U.S. Provisional Patent Application Ser. No. 63/238,672 are hereby incorporated, by reference, in their entireties.

In embodiments, a state machine may include a plurality of states. Each state represents the state of the state machine or sub-machine, and may be associated with an entry action (e.g., an optional action to be executed when entering the state), a state action (e.g., an action to be executed within the state), and an exit action (e.g., an optional action to be executed when leaving the state). When the state machine moves from one state to the next state, a transition occurs. A transition may include a source state, a target state, and an event. The event may trigger a state transition from the source state to the target state. Guards, such as optional conditions that may be specified to make the transition, may be used. And the transition may further include actions, such as optional actions that can be executed when a transition is executed.

Embodiments may use state machines to drive programmable payments. For example, actions, conditions, and triggers (e.g., time-based triggers, event-based triggers, and threshold-based triggers) may be used to execute payments. The actions, conditions, and triggers may be specified by a user using drop-down menu selections. As the actions, conditions, and triggers are selected, embodiments may verify that the selected actions, conditions, or triggers are valid, and may restrict the presentation of any invalid action, condition, or trigger.

A plurality of state machines may be provided, such as one for each payment type, and state machines may include smart contracts. For example, a state machine contract may define the finite states for any payment flow. Each payment then instantiates a particular state machine as applicable for the payment type. The state machine controls the state changes and emits events when a state change happens. The events may be consumed by on-chain or off-chain application to validate programmability conditions and execute the actions.

Instead of a static entity, embodiments provide a responsive, real time dynamic entity that may enable banking capabilities to be embedded natively into business processes and supporting new business models. The intelligent automation of account transactions results in faster transactions and reduced settlement time. Embodiments also solve for trapped liquidity as treasurers no longer need to assign excess liquidity buffers during periods of downtime, such as weekends and bank holidays, and benefit from better utilization of liquidity. The intuitive interface further enables treasurers to respond more readily to structural changes in market, economic or business events to update the automation ruleset on the account activities.

Referring to FIG. 1, a system for state machine driven programmable payments is disclosed according to an embodiment. System 100 may include off-chain environment 110 and on-chain environment 150. Off-chain environment that may include a plurality of off-chain services (e.g., off-chain services $\mathbf{110}_1$, $\mathbf{110}_2$, $\mathbf{110}_3$, . . . $\mathbf{110}_n$), such as services provided by a financial institution. Examples of off-chain services 110 include sanctions services, fraud services, etc.

Off-chain environment 110 may further include off-chain state machines 120. Off-chain state machines may include a plurality of state machines 122 (e.g., state machine $\mathbf{122}_1$, state machine $\mathbf{122}_2$, . . . state machine $\mathbf{122}_n$). Examples of state machines 122 may include book-to-book transfer state machines, delivery-versus-payment state machines, margin related programmable payment state machines, etc. Examples of basic state machines that may be called by other state machines may include deposit state machines, transfer state machines, withdraw state machines, etc. The state machine 122 may be selected based on the payment type and the state workflow may be selected based on the emitted events during execution. In embodiments, one state machine (e.g., $\mathbf{122}_1$) may invoke a second state machine (e.g., $\mathbf{122}_2$) as is necessary and/or desired.

For example, book-to-book transfers state machine may include states such as payment initiated, payment qualified, controls initiated, posting initiated, and payment completed. Delivery-versus-payment state machine may include states such as payment initiated, controls initiated, funds reserved, postings queued, postings completed, and payment completed.

Other state machines may be deployed as is necessary and/or desired.

The triggers, conditions, and actions may be defined by the user, and may allow the user to dynamically change the behavior of the state machine.

On-chain environment 150 may include a plurality of components, including payment processor 160, actions 170, and on-chain state machines 180. Payment processor 160 may receive a payment request and starts the process. Based on a trigger or event, payment processor 160 may interact with one or more state machine (e.g., state machine 122 and/or state machine 182) and receives the next transition action to be executed.

TX0001, TX0002, TX0003 represent payment transactions to be initiated. Each payment transaction may be associated with a payment type, such as supplier payment, margin payment, custody payment, etc. Based on its payment type, each transaction may instantiate a specific state machine.

Actions 170 may include, for example, qualify action 172, enrich action 174, control action 176, posting action 178, and clearing action 180. Actions 170 may execute granular steps on their own and can emit the event that may then instantiate another state machine (e.g., state machine 122 and/or state machine 182) if required/configured.

Examples of qualify actions 172 may include debit authorization checks, valid account checks, account-client mapping checks, etc. Examples of enrich actions 174 may include enriching an incoming payment message with data from static data/master data systems for downstream processing. Examples of control actions 176 may include sanctions checks, fraud checks, etc. Examples of posting actions 178 may include executing ledger postings, accounting entries, debit/credit entries, etc. Examples of clearing actions 180 may include actions involving debit/credit nostro vostro bank accounts.

On-chain state machines 180 may include a plurality of state machines 182 (e.g., state machine $\mathbf{182}_1$, state machine $\mathbf{182}_2$, state machine $\mathbf{182}_3$, . . . state machine $\mathbf{182}_n$). These may be similar to state machines 122.

Embodiments may select off-chain state machines 120 or on-chain state machines 180 based on, for example, the amount of on-chain or off-chain interaction required for state machine 122 or 182. Thus, if there is more on-chain activity, state machine 182 may be used, while if there is more off-chain activity, state machine 122 may be used.

System 100 may further include user electronic device 130, which may be a computer (e.g., workstation, desktop, laptop, notebook, tablet, smart device, etc.). User electronic device 130 may execute computer program 135, which may include a user interface, for receiving a state machine definition. In one embodiment, computer program may present an "if this than that" user interface in which a user may specify conditions and actions for a state machine. Based on these definitions, computer program 135 may identify one or more machines 122 or 182, or may create a new state machine. Computer program 135 may deploy the definitions to one or more machines 122 or 182.

Once the user identifies the configurations, the user is agnostic of the state machine architecture, as embodiments, identify which state machine (e.g., state machine 122 and/or 182) needs to be invoked at what step.

Referring to FIG. 2, a method for state machine driven programmable payments is disclosed according to an embodiment.

In step 205, a user, using a computer program executed by client device, may define base state machines for basic actions. Examples of such state machines may include a deposit state machine, a withdraw state machine, and a transfer state machine. Other basic state machines may be defined as is necessary and/or desired.

In step 210, the computer program may store the state machine definitions for the basic state machines in a database, on-chain, off-chain, etc.

In step 215, the computer program may receive a programmable payment instruction (PPI) configuration from the user. In one embodiment, the client may provide definitions of triggers, conditions, actions. In one embodiment, the computer program may present an intuitive "if this then that" interface for goal/objective oriented configuration. Through this interface, the computer program may receive, for example, a payment type, conditions, and actions for a state machine.

For example, the user may submit an instruction to be notified when a transfer instruction for over a certain amount on a certain account is received.

In step 220, the computer program may dynamically link state(s) in the basic state machines to programmability rules that may be executed conditionally. For example, the computer program may store the PPI state machine definition is on-chain or off-chain depending on use case. For example, the computer program may store the state machine definition in a database.

In step 225, a payment processor may receive a message including an instruction. For example, the payment process may monitor activity on the blockchain for the trigger condition, such as a transaction request, based on the user submission. For example, the trigger may be time-based (e.g., perform this every Monday at 9:00 am), event based (e.g., perform this when making a payment to party B, when funds are received, etc.).

The payment processor may be waiting to either start a new basic state machine or perform the next step of basic state machine. The identity of the basic state machine to start or what is the next step depends on the incoming message/event.

If the event does not meet the trigger condition, it may be ignored.

If, in step 230, the payment processor may review the message to determine if there are any PPIs linked. For example, the payment processor may determine if there are PPIs linked to the message based on the trigger conditions received from the user.

For example, an account event-based trigger may have client account to which a PPI is linked. Thus, if the concerned account number is available, the PPI will be linked.

If there are PPI linked to or in the message, in step 235, the payment processor may create a request-specific state machine definition with PPI handles.

If there are not PPI linked to or in the message, in step 240, the payment process may receive the definitions for the base state machine identified in the message.

In step 245, using the base state machine definitions or the request-specific state machine definition, the payment processor may instantiate a state machine to execute the message. During execution, each step may emit an event that may be captured and may invoke another state machine definition to be loaded and executed.

In step 250, the payment processor may respond with the next instruction to be executed. The response may be based on the incoming message or the event. For example, the payment processor may respond with an action that is consistent with the client's response.

The process may continue until the instruction(s) are complete, and may then return to monitoring.

Figure 3:
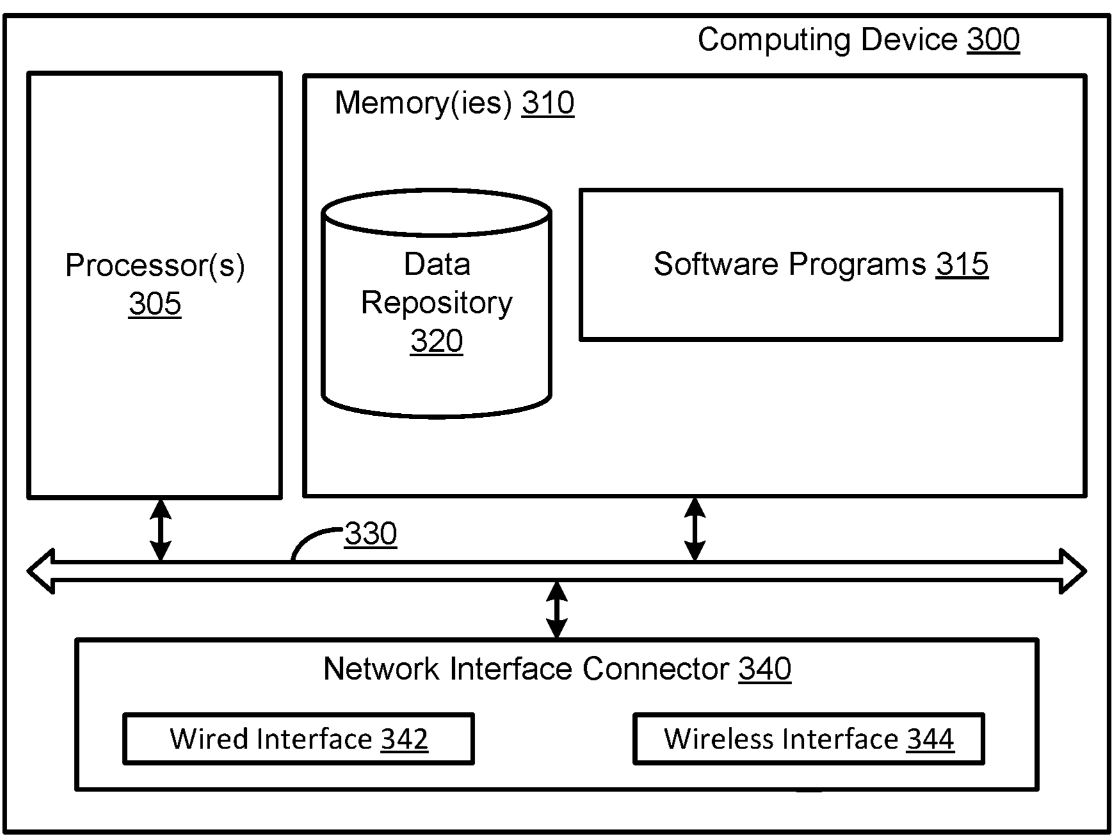
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments.

As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

defining, by a computer program executed by an electronic device, a plurality of base state machines;

storing, by the computer program, definitions for the plurality of base state machines wherein the definitions for the plurality of base state machines comprise a deposit state machine, a withdraw state machine, and a transfer state machine;

receiving, by the computer program and via a user interface, a programmable payment instruction ("PPI") from a user comprising a PPI definition for each of a PPI trigger, a PPI condition, and a PPI action;

dynamically linking, by the computer program, a state in one of the plurality of base state machines to one or more of the PPI definitions;

storing, by the computer program, the PPI definitions;

receiving, by a payment processor computer program, a payment instruction;

identifying, by the payment processor computer program and from the payment instruction, a plurality of base state machines and the PPI linked to the payment instruction, wherein the plurality of base state machines comprise at least one off-chain state machine for an off-chain interaction associated with the PPI and at least one on-chain state machine based for an on-chain interaction associated with the PPI and wherein identifying the plurality of base state machines is performed based on an amount of off-chain interaction and an amount of on-chain interaction associated with the PPI;

detecting, by the payment processor computer program, an event associated with the payment instruction before instantiating the PPI-specific state machine through the event being consumed by an on-chain application or an off-chain application;

creating, by the payment processor computer program, a PPI-specific state machine definition for the PPI linked to the payment instruction; and instantiating, by the payment processor computer program, a PPI-specific state machine for the PPI-specific state machine definitions, wherein the PPI-specific state machine is configured to call the plurality of base state machines to execute portions of the payment instruction and wherein state transitions of the PPI-specific state machine emit events that are consumed by an on-chain application or an off-chain application to validate programmability conditions and execute actions.

2. The method of claim 1, wherein the plurality of state machines are stored in an on-chain environment.

3. The method of claim 1, wherein the plurality of state machines are stored in an off-chain environment.

4. The method of claim 1, wherein the definitions for the plurality of base state machines comprise base state machine triggers, base state machine conditions, and base state machine actions.

5. The method of claim 4, wherein the state machine triggers are event-based or time-based.

6. The method of claim 1, wherein the user interface comprises an 'if this then that" interface.

7. A non-transitory computer readable storage medium, including instructions stored thereon, which when read and executed by one or more computer processors, cause the one or more computer processors to perform steps comprising:

defining a plurality of base state machines;

storing definitions for the plurality of base state machines wherein the definitions for the plurality of base state machines comprise a deposit state machine, a withdraw state machine, and a transfer state machine;

receiving, via a user interface, a programmable payment instruction ("PPI") from a user comprising a PPI definition for each of a PPI trigger, a PPI condition, and a PPI action;

dynamically linking a state in one of the plurality of base state machines to one or more of the PPI definitions;

storing the PPI definitions;

receiving a payment instruction;

identifying, from the payment instruction, a plurality of base state machines and the PPI linked to the payment instruction, wherein the plurality of base state machines comprise at least one off-chain state machine based on an amount of off-chain interaction associated with the PPI and at least one on-chain state machine based on an amount of on-chain interaction associated with the PPI and wherein identifying the plurality of base state machines is performed based on an amount of off-chain interaction and an amount of on-chain interaction associated with the PPI;

detecting, by the payment processor computer program, an event associated with the payment instruction before instantiating the PPI-specific state machine through the event being consumed by an on-chain application or an off-chain application;

creating a PPI-specific state machine definition for the PPI linked to the payment instruction;

instantiating a PPI-specific state machine for the PPI-specific state machine definitions; and calling the plurality of base state machines to execute portions of the payment instruction and wherein state transitions of the PPI-specific state machine emit events that are consumed by an on-chain application or an off-chain application to validate programmability conditions and execute actions.

8. The non-transitory computer readable storage medium of claim 7, wherein the plurality of state machines are stored on-chain.

9. The non-transitory computer readable storage medium of claim 7, wherein the plurality of state machines are stored off-chain.

10. The non-transitory computer readable storage medium of claim 7, wherein the definitions for the plurality of base state machines comprise base state machine triggers, base state machine conditions, and base state machine actions.

11. The non-transitory computer readable storage medium of claim 7, wherein the user interface comprises an ‘if this then that” interface.

* * * * *